United States Patent [19]
Govoni et al.

[11] Patent Number: 5,410,002
[45] Date of Patent: Apr. 25, 1995

[54] PROCESS FOR THE GAS-PHASE POLYMERIZATION OF ALPHA-OLEFINS

[75] Inventors: Gabriele Govoni, Renazzo; Giovanni Patroncini, Ferrara, both of Italy

[73] Assignees: Spherilene S.r.l., Milan, Italy; Himont Incorporated, Wilmington, Del.

[21] Appl. No.: 10,749

[22] Filed: Jan. 29, 1993

[30] Foreign Application Priority Data

Jan. 31, 1992 [IT] Italy .................. MI92A0191

[51] Int. Cl.⁶ .................................................. C08F 2/34
[52] U.S. Cl. ...................................... 526/88; 526/125; 526/138; 526/141; 526/352; 526/901
[58] Field of Search ............... 526/78, 125, 138, 141, 526/901, 88

[56] References Cited

U.S. PATENT DOCUMENTS

| | | | |
|---|---|---|---|
| 3,298,792 | 1/1967 | Di Drusco | 526/88 |
| 4,218,339 | 8/1980 | Zucchini et al. | 252/429 B |
| 4,298,718 | 11/1981 | Mayr et al. | 526/125 |
| 4,472,520 | 9/1984 | Zucchini et al. | 502/104 |
| 4,495,338 | 1/1985 | Mayr et al. | 526/125 |
| 4,518,750 | 5/1985 | Govoni et al. | 526/68 |
| 4,526,943 | 7/1985 | Fuentes, Jr. et al. | 526/133 |
| 4,673,661 | 6/1987 | Löfgren et al. | 502/111 |
| 4,716,206 | 12/1987 | Fujita et al. | 526/139 |
| 4,739,015 | 4/1988 | Toyota et al. | 525/270 |
| 4,803,251 | 2/1989 | Goode et al. | 526/59 |
| 5,028,670 | 7/1991 | Chinh et al. | 526/73 |

FOREIGN PATENT DOCUMENTS

| | | |
|---|---|---|
| 229368 | 7/1987 | European Pat. Off. . |
| 232701 | 8/1987 | European Pat. Off. . |
| 241560 | 10/1987 | European Pat. Off. . |
| 359444 | 3/1990 | European Pat. Off. . |
| 362629 | 4/1990 | European Pat. Off. . |
| 364759 | 4/1990 | European Pat. Off. . |
| 449673 | 10/1991 | European Pat. Off. . |
| 488533 | 6/1992 | European Pat. Off. . |

*Primary Examiner*—Joseph L. Schofer
*Assistant Examiner*—David Wu
*Attorney, Agent, or Firm*—Maurice B. Stiefel; Bryan Cave

[57] ABSTRACT

The present invention relates to a process for the production of homopolymers of ethylene and copolymers of ethylene with olefins $CH_2=CHR$, wherein R is an alkyl or aryl radical having a number of carbon atoms of from 1 to 10, and having a density greater than 0.86 g/cm³, comprising at least one (co)polymerization step in the gas phase, in the presence of an active catalyst obtained from a titanium compound supported on a magnesium halide in active form and an Al-alkyl compound. The process is characterized in that a small amount compared with the polymer is fed to the gas-phase reactor of a polyfunctional compound having at least two groups, the same or different, capable of reacting with the alkyl aluminum compound and capable of selectively inhibiting the reactivity of the polymer particle fines compared with the average granulometric size of the polymer present in the bed of a gas-phase polymerization reactor.

9 Claims, 1 Drawing Sheet

PROCESS FOR THE GAS-PHASE POLYMERIZATION OF ALPHA-OLEFINS

FIELD OF THE INVENTION

The present invention relates to a process for the production of ethylene homopolymers or copolymers of ethylene with olefins $CH_2=CHR$, wherein R is an alkyl or aryl radical having a number of carbon atoms of from 1 to 10, comprising at least one (co)polymerization step in the gas phase, in the presence of an active catalyst obtained from a titanium compound supported on a magnesium halide in active form and an Al-alkyl compound. The process is characterized in that it is carried out by adding a small amount with respect to the polymer of a polyfunctional compound having at least two groups, the same or different, capable of reacting with the alkyl aluminum compound and capable of selectively inhibiting the reactivity of the finest polymer particles present in the bed of a gas-phase polymerization reactor.

BACKGROUND INFORMATION

Processes for the polymerization of ethylene or mixtures of ethylene with alpha olefins to form copolymers having a density greater than 0.86 g/cm³ are known which are carried out in the gas phase in fluidized or mechanically stirred bed reactors, in the presence of catalysts obtained from compounds of transition metals belonging to groups IV, V or VI of the Periodic Table of the Elements and aluminum alkyl compounds or in the presence of catalysts based on chromium oxide.

The polymer is obtained in the form of granules having a more or less regular morphology depending on the morphology of the catalyst; the dimensions of the granules depend on the dimensions of the catalyst particles and on reaction conditions and are generally distributed around an average value.

In these types of processes the heat of reaction is removed by means of a heat exchanger placed inside the reactor or in the recycle line of the reaction gas.

A generally encountered problem in polymerization processes of this type results from the presence of very fine polymer particles which are either produced from already existing fine catalyst particles or derive as a result of breakage of the catalyst itself.

These fine particles tend to deposit onto and electrostatically adhere to the inner walls of the reactor and the heat exchanger, and to thereafter grow in size by chemical reaction thus causing an insulating effect and a lower heat transfer resulting in the formation of hot spots in the reactor.

These effects are enhanced when the gas-phase ethylene (co)polymerization process is carried out in the presence of highly active catalysts such as those comprising the reaction product of an aluminum alkyl with a titanium compound supported on a magnesium halide in active form.

As a consequence a loss in fluidization efficiency and homogeneity generally occurs; for example catalyst feeding interruption may occur as well as plugging of the polymer discharge system; furthermore, excess temperature can result in particle melting with the formation of fused polymer material/sheets which adhere to the reactor walls and may plug the gas distribution plate and/or the polymer discharge systems forcing shutdown of the reactor.

These drawbacks lead to poor process reproducibility and can lead to a forced interruption of the run in order to remove deposits which have formed inside the reactor even after relatively short times.

Several solutions have been proposed to avoid these drawbacks, either by acting on the catalyst activity or by reducing or eliminating the electrostatic voltage.

Patent Application EP-359444 describes the introduction into the polymerization reactor of small amounts (generally smaller than 0.1 ppm with respect to the polymerization mixture) of a retarder selected from polymerization inhibitors or substances able to poison the catalyst, in order to reduce the olefin polymerization rate. However, as described in the same patent application, the use of larger quantities of the retarder adversely affects both the quality and properties of the polymer produced, such as the melt index, the melt flow ratio and/or the stereoregularity of the polymer, as well as reducing the efficiency of the process.

U.S. Pat. No. 4,739,015 describes the use of oxygen containing gaseous products and liquid or solid compounds containing active hydrogens to prevent the formation of agglomerates and reactor fouling due to sticking of the elastomeric particles in processes for preparing heterophasic propylene polymers containing an elastomeric phase. Among the compounds containing active hydrogens, ethanol, methanol, ethylene glycol, propylene glycol and diethylene glycol are cited.

These compounds, which are known as polymerization inhibitors, must be used in an amount of a few ppm with respect to the polymer in order not to deactivate the catalyst; at such concentrations they are not effective as to a selective deactivation of the fine catalyst particles, whereas at higher concentrations the polymerization does not take place. Therefore, the use of the components described in said patent does not solve the problem of inhibiting the reactivity of the fine polymer particles present in a gas-phase (co)polymerization of ethylene and their consequent adhesion to the reactor walls.

Different techniques have been proposed to reduce or eliminate the electrostatic voltage responsible for the phenomena of migration and formation of deposits on the walls.

In U.S. Pat. No. 4,803,251 a group of chemical additives is described which generate both positive and negative charges in the reactor, and which are fed to the reactor in an amount of a few ppm per part of the monomer in order to prevent the formation of undesired positive or negative charges. Also in this case the remedy may involve a deterioration in polymer quality as well as a decrease in reactor productivity.

Patent EP-B-232701 describes the use of antistatic agents to prevent the formation of crusts inside the reactor during processes for the preparation of ultra high molecular weight polyethylene (UHMWPE) wherein the polymer is in the form of a powder having an average particle diameter smaller than 1 mm and wherein the antistatic agent is used to solve the problems associated with the presence of electrostatic charges in the ultra high molecular weight polyethylene powders. The preferred antistatic agent is a mixture of a chromium organic salt with a calcium organic salt and a phenolic stabilizer, and has to be used in an amount lower than 200 ppm, preferably comprised between 5 and 100 ppm, in order not to interfere with the catalyst activity.

The antistatic agent prevents the formation of crusts inside the reactor but, as clearly shown in subsequent patents EP-A-362629 and EP-A-364759, the polymers have a rather low bulk density and in the films obtained therefrom impurities are present in the form of unmelted products.

These last patents suggest a pretreatment of the catalyst with the antistatic agent, in order to eliminate these drawbacks. To this purpose the antistatic agent, used in an amount of a few ppm by weight with respect to the final polymer but which may reach up to 1,000% by weight with respect to the catalyst, must not contain functional groups capable of deactivating the catalyst. Also by this route a certain amount of impurities still remains in the films obtained from these polymers.

Patent EP-B-229368 describes the use of antistatic agents to prevent the formation of crusts inside the reactor during polymerization or copolymerization processes of ethylene in the gas phase.

The preferred antistatic agent is a mixture of a chromium organic salt with a calcium organic salt and a phenol stabilizer and has to be used in an amount lower than 100 ppm with respect to the polymer in order not to interfere with the catalyst activity.

Other processes for reducing or eliminating the electrostatic voltage include (1) installation of grounding devices in a fluidized bed, (2) ionization of gas or particles by electrical discharge to generate ions which neutralize electrostatic charges on the particles and (3) the use of radioactive sources to produce radiation capable of generating ions which neutralize electrostatic charges on the particles.

However, the use of these techniques in an industrial scale fluid bed polymerization reactor is generally neither practical or easy.

Fluidized or stirred beds consist of polymer particles having a defined geometric shape and a granulometric distribution preferably narrow and generally distributed over values higher than 500 $\mu$m.

The presence of a significant amount of fine particles mainly deriving from breakage of a portion of the catalyst gives rise to the problem of the adhesion of these particles to the reactor walls.

None of the techniques proposed to date for preventing adhesion of the polymer to the reactor walls during gas-phase ethylene polymerization processes in fluid bed systems provides a solution to the problem of inhibiting the reactivity of the polymer particle fines, which problem is to be considered among the main causes responsible for the adhesion phenomenon and for the sheeting drawbacks deriving therefrom.

Therefore, the need is felt for solutions which do not decrease the activity of the catalyst system, as it conversely occurs by using chemical compounds inhibiting polymerization reactions, and which at the same time inhibit the polymerization of fine particles which generally leads to the formation of sheets.

SUMMARY OF THE INVENTION

It has now been surprisingly found that by using particular organic compounds in appropriate amounts it is possible to selectively deactivate the fine catalyst particles (already pre-existing or formed during polymerization) without reducing the polymerization yield or slowing down the course of the process.

By this manner, sheeting on the reactor walls and/or clogging of charge and discharge pipes is avoided, while preserving at the same time process efficiency and product quality.

Differently from the additives generally used in the prior art which must be used at very low concentrations in order not to poison the catalyst, the compounds of the process of the invention are used in sufficiently large quantities so that they may concentrate on the finest catalyst particles and deactivate them.

The process of the present invention is suitable for the production of ethylene homopolymers and copolymers of ethylene with olefins $CH_2=CHR$, wherein R is an alkyl or aryl radical having a number of carbon atoms of from 1 to 10, having a density greater than 0.86 g/cm$^3$.

The process comprises at least one (co)polymerization step in the gas phase in which a fluidized or stirred bed is maintained, in the presence of a catalyst comprising the product of the reaction of (1) a solid catalyst component comprising a titanium compound supported on a magnesium dihalide in active form optionally comprising an electron donor with (2) an alkyl aluminum compound optionally in the presence of an electron donor, wherein:

the fluidized or stirred bed comprises polymer particles at least 80% of which being larger than 500 $\mu$m and less than 10% being smaller than 200 $\mu$m; and a polyfunctional compound (3), having a chain of at least 4 carbon atoms and containing at least two groups capable of reacting with the alkyl aluminum compound, is fed at any stage of the process in an amount greater than 100 ppm by weight with respect to the polymer produced, the molar ratio of the compound (3) to the alkyl aluminum compound being lower than 1;

said compound (3) being further capable, when used in a standard polymerization test of mixtures of ethylene and propylene, of selectively inhibiting the polymerization on polymer particles smaller than 850 $\mu$m.

The standard test used as the evaluation criterion is described hereinbelow.

Preferably an alkane having from 3 to 5 carbon atoms is present in the gas phase during polymerization, said alkane being present in an amount of from 20 to 90% with respect to the total gas.

DETAILED DESCRIPTION

Figure 1:
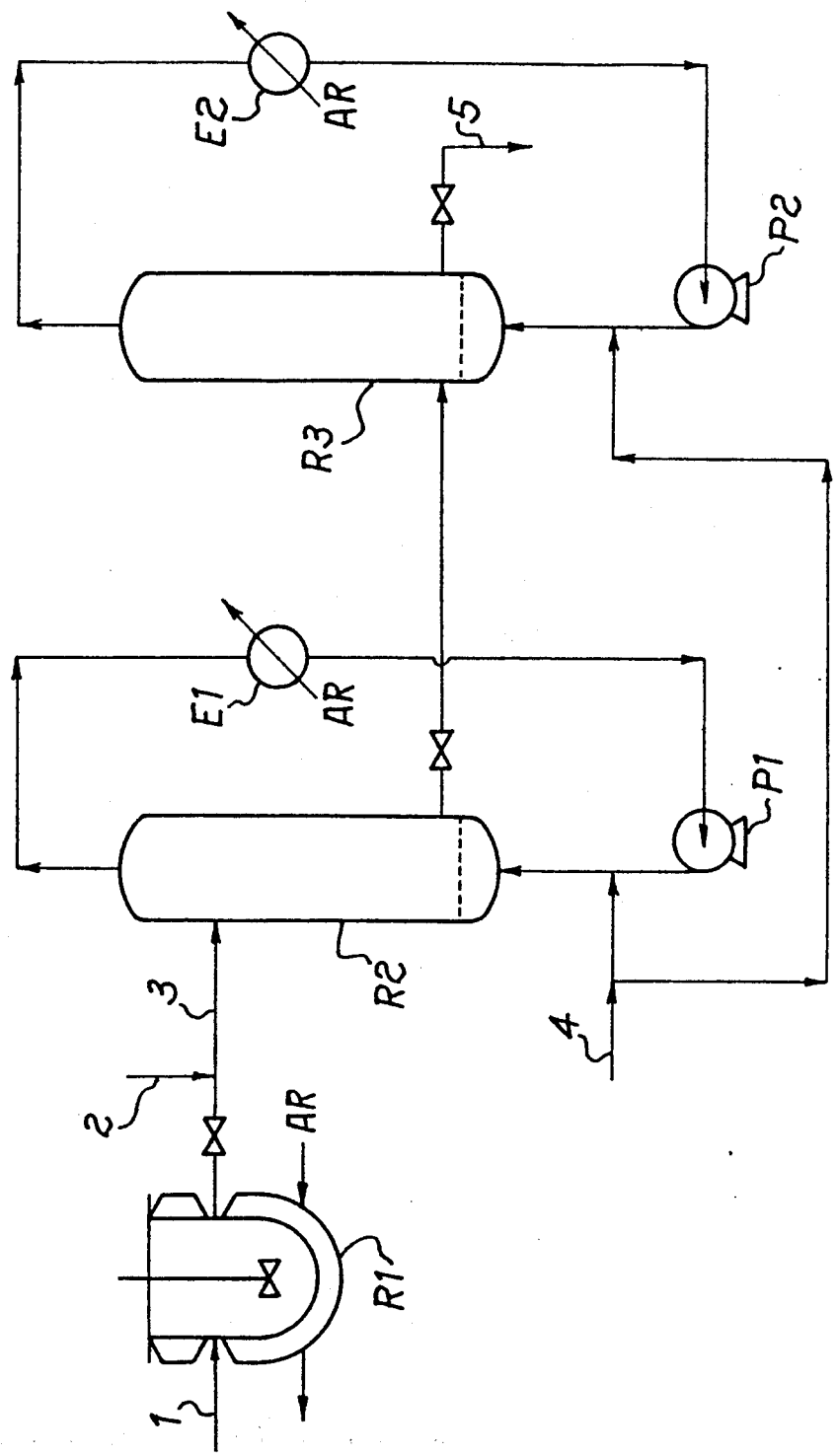
FIG. 1 depicts one embodiment of an apparatus which can be employed in accordance with the present invention.

As groups capable of reacting with the alkyl aluminum compound such groups are intended which are capable of giving substitution reactions with the alkyl aluminum compounds, such as for instance the reaction

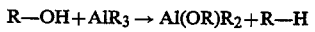

$$R-OH + AlR_3 \rightarrow Al(OR)R_2 + R-H$$

Surprisingly and unexpectedly it has been found that compounds (3) preferably concentrate on the particles having a smaller size. Owing to the reactive groups present, the alkyl aluminum compound is deactivated by reacting with said reactive groups; the polymerization on the smaller particles is thus prevented.

The same effect is not observed with compounds which, though containing two or more reactive groups, have less than four carbon atoms in the chain, such as for instance glycerol or propylene glycol. At low concentrations said compounds do not inhibit the polymerization on the finest particles, whereas at the concentrations at which the compounds of the invention operate, they deactivate the catalyst thus not allowing the polymerization to actually take place.

The polyfunctional compound (3) may also perform an antistatic action, when not all of its functional groups have reacted with the alkyl aluminum compound.

Examples of compounds (3) usable in the process of the invention are:

a) polyalcohols containing chains having at least 4 carbon atoms, preferably from 4 to 8 carbon atoms and among these preferably sorbitol and 1,4-butanediol.

b) hydroxyesters, having at least two free hydroxyl groups, obtained from carboxylic acids having at least 4 and preferably from 8 to 22 carbon atoms and from polyalcohols, and among these preferably glycerol monostearate and sorbitan monooleate.

c) N-alkyl diethanolamines of the formula $CH_3(CH_2)_nCH_2N(CH_2CH_2OH)_2$, wherein n is greater than 2 and preferably comprised between 6 and 20. A representative compound is a commercial product sold under the trademark of Atmer 163 by ICI.

d) polyepoxidate oils such as epoxidate linseed oil and epoxidate soya oil. Representative compounds are the products sold under the trademarks Edenol D82 and Edenol B316 by Herkel.

As already specified, the compounds (3) are fed in an amount such that their content by weight with respect to the polymer is generally comprised between 100 and 2,000 ppm, preferably between 100 and 800, and their molar ratio to the alkyl aluminum compound (2) is lower than 1 and generally comprised between 0.05 and 0.8.

The amount of compound (3) to be used varies within this range depending on the granulometric distribution of the catalyst or of the polymer which is being formed. Generally, larger quantities of compound (3) are used when a higher content of fine particles is present.

The quantity of compound (3) also depends on the nature itself of the compound; it has been observed for instance that compounds of class (d) generally work at lower concentrations than other compounds, all conditions being equal.

As previously indicated, the gas phase may also contain an inert $C_3$—$C_3$ alkane in an amount of from 20 to 90% molar, preferably from 30 to 90% molar, with respect to the total gas. Suitable alkanes include propane, butane, isobutane, n-pentane, isopentane, cyclopropane, and cyclobutane. Preferably the alkane is propane.

The alkane is fed into the reactor either with the monomer or separately and is recycled with the recycle gas, i.e., the gas stream which does not react in the bed and which is removed from the polymerization zone, preferably by passing it into a velocity reduction zone above the bed where entrained particles are given an opportunity to drop back into the bed. The recycle gas is compressed and thereafter passed through a heat exchanger before it is returned to the bed. See, for instance, U.S. Pat. Nos. 3,298,792 and 4,518,750 for a description of gas-phase reactors and techniques.

As indicated, the process of the present invention is applied to the preparation of ethylene homopolymers or copolymers of ethylene with olefins $CH_2=CHR$, wherein R is an alkyl or aryl radical having a number of carbon atoms of from 1 to 10, having a density greater than 0.86 g/cm$^3$. Examples of said ethylene polymers are:

high density polyethylenes (HDPE, having a density greater than 0.940 g/cm$^3$), including homopolymers of ethylene and copolymers of ethylene with alpha-olefins having from 3 to 12 carbon atoms;

linear low density polyethylenes (LLDPE, having a density lower than 0.940 g/cm$^3$) and very low and ultra low density linear polyethylenes (VLDPE and ULDPE, having a density lower than 0.920 g/cm$^3$ and as low as 0.860 g/cm$^3$) consisting of copolymers of ethylene with one or more alpha-olefins having from 3 to 12 carbon atoms.

In the polymers obtained according to the process of the invention, it is observed that compound (3) is selectively concentrated on the fraction of the polymer having a smaller size.

Compound (3) may be fed at any stage of the polymerization process.

An example of plant flow sheet usable for the process of the present invention is represented in FIG. 1, where E1 and E2 indicate heat exchangers and P1 and P2 indicate compressors. The plant comprises a reactor R1, wherein small amounts of monomer are prepolymerized in the presence of the catalyst components and two fluid bed reactors, R2 and R3, wherein the gas-phase polymerization takes place. Using said plant, component (3) is added after the prepolymerization step, before introducing the prepolymer into the first gas-phase reactor R2; optionally and advantageously component (3) can be partially added even after the first gas-phase reactor R2, before the optional introduction of the polymer being formed into the second gas-phase reactor R3.

The catalyst used in the process of the invention comprises the reaction product of:

1) a solid component comprising a titanium compound supported on a magnesium dihalide in active form; the solid component may also comprise an electron donor compound (inside donor); with 2) an alkyl aluminum compound, optionally in the presence of an electron donor compound (outside donor).

The active magnesium dihalides used as support of the Ziegler-Natta catalysts are extensively described in the patent literature. U.S. Pat. Nos. 4,298,718 and 4,495,338 have described for the first time the use of these supports.

The active magnesium dihalides present as support in the catalyst component used in the process of the present invention are characterized by X-ray spectra wherein the most intense diffraction line which appears in the spectrum of the nonactive halide has reduced intensity and is substituted by a halo with the maximum intensity shifted towards lower angles with respect to the angle of the most intense line.

Preferably the magnesium halide is magnesium dichloride.

The titanium compounds suitable for the preparation of the solid component include titanium halides such as TiCl$_4$, which is preferred, TiCl$_3$ and titanium alcoholates such as trichlorophenoxy- and trichlorobutoxy titanium.

The titanium compound may be used in mixture with other transition metal compounds such as vanadium, zirconium and hafnium compounds.

Suitable inside electron-donors include ethers, esters, amines, ketones and diethers of the general formula

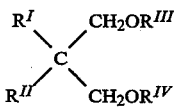

wherein $R^I$ and $R^{II}$, the same or different from each other, are alkyl, cycloalkyl and aryl radicals having a number of carbon atoms of from 1 to 18 and $R^{III}$ and $R^{IV}$, the same or different from each other, are alkyl radicals with a number of carbon atoms of from 1 to 4.

Using the catalysts obtained from the catalyst components described in Italian Patent Applications MI92-A-000194 and MI92-A-000195, the description thereof being herein incorporated by reference, it is possible to prepare spherical polymers having an average diameter comprised between 300 and 5,000 μm and having a high bulk density.

The invention can also be applied to the preparation of polymers having a regular geometric shape different from the spherical shape. Examples of said polymers are the polymers which can be obtained using the supports and catalysts described in patent application EP-A-449673.

Also falling within the class of components usable in the process of the invention are the compounds described in U.S. Pat. Nos. 4,472,520 and 4,218,339.

The alkyl aluminum compound (2) is selected among aluminum trialkyls such as Al-triethyl, Al-triisobutyl, Al-tri-n-butyl, Al-tri-n-hexyl, and Al-tri-n-octyl. Mixtures of Al-trialkyls with Al-trialkylhalides or Al-alkyl-sesquichlorides such as $AlEt_2Cl$ and $Al_2Et_3Cl_3$ can also be used.

The Al/Ti ratio in the catalyst is greater than 1 and it is generally comprised between 10 and 4,000, preferably between 20 and 800.

The efficiency of the process of the invention has been evaluated by some standard tests aimed at evaluating the performance of some compounds as selective inhibitors in regard to very fine particles. By performing these tests, sticky polymers were intentionally produced in at least one stage or the polymerization process.

The method used consists of a two-step polymerization carried out in the same autoclave; in the first stop polymerization to propylene homopolymer is carried out, in liquid propylene, and in the second step, after degassing, a gas-phase copolymerization onto the homopolymer matrix is carried out using a gaseous mixture of ethylene and propylene. Before degassing a certain quantity of the chemical compound (3) is added to the autoclave.

The ability to reduce the formation of polymer on the smallest particles is evaluated through the content of ethylene respectively bound onto the granulometric fraction having a diameter greater than 850 μm and onto the fraction having a diameter smaller than 850 μm.

If the ethylene content in the fraction <850 μm is significantly lower than the content in the fraction >850 μm (ratio of the content in the fraction >850 μm to the content in the fraction <850 μm equal to or greater than 1.15) compound (3) is considered to be an effective inhibitor and it can therefore be used in the process of the invention.

The effectiveness is also evaluated in terms of the polymerization yield, in that the yield has to be at the same level as in the test carried out in the absence of compound (3).

The following examples can further illustrate the present invention and have not to be intended as limitative of the invention itself.

General Procedure for the Preparation of the Catalyst

The catalyst component (1) used in the examples was prepared as follows.

Under an inert atmosphere, 28.4 g of $MgCl_2$, 49.5 g of anhydrous ethanol, 10 ml of ROL CB/30 vaseline oil, and 100 ml of silicone oil having a viscosity of 350 cs were introduced into a reaction vessel equipped with a stirrer and heated at 120° C. until the $MgCl_2$ was dissolved. The hot reaction mixture was then transferred to a 1,500 ml vessel equipped with an Ultra Turrax T-45N stirrer and containing 150 ml of vaseline oil and 150 ml of silicone oil. The temperature was maintained at 120° C. while stirring for 3 minutes at 3,000 rpm. The mixture was then discharged into a 2 liter vessel equipped with a stirrer and containing 1,000 ml of anhydrous n-heptane cooled at 0° C. The obtained particles were recovered by filtering, washed with 500 ml aliquots of n-hexane and heated gradually by increasing the temperature from 50° C. to 100° C. for a period of time sufficient to reduce the alcohol content from 3 mole to the contents indicated in the various examples.

25 g of the adduct, containing the various quantities of alcohol specified in the examples, were transferred into a reaction vessel equipped with a stirrer and containing 625 ml of $TiCl_4$ at 0° C. under agitation, and thereafter the temperature was raised to 100° C. in one hour; when the temperature reached 40° C., diisobutylphthalate was added in an amount such that the molar ratio of magnesium to the phthalate was 8.

The contents of the reactor vessel were then heated at 100° C. for two hours, under agitation, then the agitation was stopped and the solid was allowed to settle.

The hot liquid was removed by siphon. 500 ml of $TiCl_4$ were added and the mixture was heated at 120° C. for one hour under agitation. The agitation was interrupted and the solid was allowed to settle. The hot liquid was removed by siphon. The solid was washed with aliquots of n-hexane at 60° C. and thereafter at room temperature.

EXAMPLES 1–7

The following examples relate to some standard tests aimed at evaluating the effectiveness of some compounds as inhibitors of fine particles in the process of the invention.

The tests were carried out in a 4 liter autoclave for polymerization tests. After degassing and washing with propylene the autoclave was kept at 30° C. under a moderate propylene flow.

The run was carried out by feeding a catalyst complex dispersed in hexane and comprising 0,01 g of a solid catalyst component prepared according to the previously described general procedures using a $MgCl_2$-ethanol adduct containing 50% by weight of alcohol, 0.76 g of aluminum triethyl (TEAL) and 0.081 g of diphenyl-dimethoxy-silane as the outside donor. Thereafter a quantity of hydrogen was fed to obtain a Melt Index 'L' within the range of values of from 2 to 6; agitation continued while feeding propylene in an amount of 2.3 liters at normal temperature.

The temperature was raised to 70° C. and the polymerization to propylene homopolymer was carried out for 110 minutes. The temperature was lowered by 10° C. and compound (3) was injected dissolved in 20 cc of hexane, polymerizing thereafter for an additional 10 minutes.

At this point the agitation was stopped and the propylene was degassed to 5 bar while keeping the temperature constant at 70° C. The polymerization was resumed by feeding ethylene up to a total of 10 bar and maintaining the pressure by feeding a preformed ethylene/propylene mixture in a 65/35 molar ratio. Said mixture was fed up to 15% by weight of the final product. Finally degassing was carried out to end.

In Table 1, besides the operating conditions of the copolymerization step, the contents of bound ethylene on the granulometric fraction having diameter larger than 850 μm and on the fraction having diameter smaller than 850 μm respectively are reported.

COMPARATIVE EXAMPLE 8

A heterophasic propylene copolymer was prepared according to the operating method described in Examples 1-7, but without adding any compound before the copolymerization step. The results in Table 1 clearly show that the ethylene content is substantially the same both on the fractions having a granulometry >850 μm and on those having a granulometry <850 μm.

COMPARATIVE EXAMPLE 9

A heterophasic propylene copolymer was prepared according to the procedures described in Examples 1-7, but using as the inhibitor agent a compound which does not contain functional groups. An M100 silicon oil was used in an amount equal to 0.76 g. This compound, for a mole ratio of 0.126 to TEAL, was found to have an influence on the reaction rate, but did not cause a reduction in the amount of bound ethylene on the fine fractions.

COMPARATIVE EXAMPLES 10a, 10b, 11

Comparative Example 9 was repeated using as inhibitors difunctional or polyfunctional compounds containing less than 4 carbon atoms. Monopropylene glycol and glycerol were used in the amounts indicated in Table 1. The results reported in Table 1 show that low percentages of monopropylene glycol (propylene glycol/TEAL=1.5 molar) are not effective (Example 10a); a higher percentage (propylene glycol/TEAL=2.24 molar) is effective but it significantly slows the reaction (Example 10b); glycerol is not effective (Example 11).

EXAMPLE 12

A pilot plant operating in continuous for the preparation of LLDPE is used. The plant, illustrated in FIG. 1, comprises a prepolymerization reactor R1, to which were fed a solid catalyst component prepared according to the previously indicated general procedures using $MgCl_2$-ethanol adduct containing 45% by weight of alcohol, a solution of alkyl aluminum in an inert hydrocarbon, an electron donor compound and a small amount of propylene (line 1). Downstream this section the reaction took place in two gas-phase reactors in series R2 and R3. The stream coming out from the polymerization reactor (line 3), consisting of a slurry of prepolymer (polypropylene) in an inert liquid, was contacted with a stream of Atmer 163 in a determined ratio to the aluminum alkyl (line 2) and was thereafter sent to the first gas-phase polymerization stage.

The reaction monomers fed through line 4 were as follows:
ethylene and butene;
hydrogen as molecular weight regulator.

The product was discharged from the second gas-phase reactor through line 5.

| Main Operating conditions | |
|---|---|
| Temperature | 25° C. |
| Residence time | 87 min. |
| 1st Gas-Phase Reactor | |
| Temperature | 75° C. |
| Pressure | 18 bar |
| Atmer/TEAL | 0.5 (by weight) |
| $H_2/C_2$ | 0.16 (molar) |
| $C_4/(C_2 + C_4)$ | 0.118 (molar) |
| 2nd Gas-Phase Reactor | |
| Temperature | 75° C. |
| Pressure | 17 bar |
| $H_2/C_2$ | 0.213 (molar) |
| $C_4/(C_2 + C_4)$ | 0.134 (molar) |
| Final Characteristics of the Product | |
| Real density | 0.919 kg/l |
| Melt Index "E" | 1.1 g/10 min. |

The average polymer productivity was 75 kg/hr.

The plant ran with the same set-up and the same type of product for about 9 days under conditions of absolute reliability.

EXAMPLE 13

A pilot plant operating in continuous for the preparation of LLDPE was used. The plant, illustrated in FIG. 1, comprised a prepolymerization reactor R1, to which were fed (line 1) a solid catalyst component prepared according to the previously indicated general procedures using $MgCl_2$-ethanol adduct containing 45% by weight of alcohol, a solution of alkyl aluminum in an inert hydrocarbon, an electron donor compound and a small amount of propylene. Downstream this section the reaction was carried out in two gas-phase reactors in series, R2 and R3. The stream coming out from the polymerization reactor (line 3) and consisting of a slurry of prepolymer (polypropylene) in an inert liquid, was contacted with a stream of Atmer 163 in a certain ratio to the aluminum alkyl (line 2) and was thereafter sent to the first gas-phase polymerization stage.

The reaction monomers fed through line 4 were as follows:
ethylene and butene;
hydrogen as molecular weight regulator.

The product was discharged from the second gas-phase reactor, through line 5.

| Main Operating conditions | |
|---|---|
| Prepolymerization Step $R_1$ | |
| Temperature | 25° C. |
| Residence time | 137 min. |
| 1st Gas-Phase Reactor | |
| Temperature | 70° C. |
| Pressure | 18 bar |
| Atmer/TEAL | 0.5 (by weight) |
| $H_2/C_2$ | 0.36 (molar) |
| $C_4/(C_2 + C_4)$ | 0.21 (molar) |
| Propane/$C_2$ | 1,54 (molar) |
| 2nd Gas-Phase Reactor | |
| Temperature | 70° C. |
| Pressure | 15 bar |
| $H_2/C_2$ | 0.346 (molar) |
| $C_4/(C_2 + C_4)$ | 0.275 (molar) |
| Propane/$C_2$ | 0,784 (molar) |

-continued

Final Characteristics of the Product
Real density          0.909 kg/l
Melt Index "E"        2.0 g/10 min.

The average polymer productivity was 63 kg/hr.

The plant ran with the same set-up and the same type of product for about 9 days under conditions of absolute reliability.

TABLE 1

| Ex. No. | Compound Used (g) | COPOLYMERIZATION Compound (3)/TEAL (molar) | Duration | Yield Kg/g at | % Ethylene on fraction >850 μm | % Ethylene on fraction >850 μm | Compound (3) ppm by weight on polymer) |
|---|---|---|---|---|---|---|---|
| 1 | EDENOL D82 (0.38) | 0.08 | 90 | 47.5 | 14.0 | 9.0 | 800 |
| 2 | EDENOL B315 (0.38) | 0.06 | 55 | 44.3 | 12.9 | 5.5 | 820 |
| 3 | SORBITAN-MONOOLEATE (0.38) | 0.127 | 65 | 52.6 | 17 | 7.8 | 720 |
| 4 | GLYCEROL-MONOSTEARATE (0.38) | 0.158 | 70 | 45 | 18 | 13.5 | 850 |
| 5 | 1,4-BUTANEDIOL (0.2) | 0.33 | 60 | 46 | 14.5 | 7.6 | 435 |
| 6 | ATMER (0.76) | 0.29 | 60 | 48 | 10.3 | 8.3 | 1650 |
| 7 | SORBITOL (0.78) | 0.63 | 50 | 44 | 13.0 | 6.4 | 1650 |
| 8 comp | TEST WITHOUT COMPOUND (3) | — | 40 | 45.7 | 12.5 | 12.0 | — |
| 9 comp | M100 SILICON OIL (0.76) | 0.126 | 80 | 47 | 13.1 | 14.0 | 1617 |
| 10a comp | MONOPROPYLENE GLYCOL (0.76) | 1.5 | 50 | 44.2 | 11.0 | 11.5 | 1434 |
| 10b comp | MONOPROPYLENE GLYCOL (1.14) | 2.24 | 90 | 35.8 | 7.0 | 2.2 | 2150 |
| 11 comp | GLYCEROL (0.56) | 0.90 | 30 | 36.4 | 16.5 | 17.6 | 1170 |

We claim:

1. A process for the production of homopolymers of ethylene or copolymers of ethylene with olefins $CH_2=CHR$, wherein R is an alkyl or aryl radical having from 1 to 10 carbon atoms, comprising at least one (co)polymerization step in the gas phase in which a fluidized or stirred bed is maintained, in the presence of a catalyst comprising the product of the reaction of (1) a solid component comprising a titanium compound supported on a magnesium dihalide in active form optionally comprising an inside electron donor with (2) an alkyl aluminum compound optionally in the presence of an outside electron donor, wherein:

a. said fluidized or stirred bed comprises polymer particles at least 80% of which being larger than 500 μm and less than 10% being smaller than 200 μm; and
  a polyfunctional compound (3), having a chain with at least 4 carbon atoms and containing at least two groups, the same or different, capable of reacting with the alkyl aluminum compound (2) is added during said process, the molar ratio of the compound (3) to said alkyl aluminum compound (2) being lower than 1:
    i. said compound (3) being capable, when used in a standard polymerization test of ethylene and propylene mixtures, to selectively inhibit the polymerization on polymer particles smaller than 850 μm, and
    ii. said compound (3) being fed at any stage of the process in an amount greater than 100 ppm by weight with respect to said ethylene (co)-polymer;

wherein said hompolymers of ethylene and copolymers of ethylene with olefins $CH_2=CHR$ are selected from the group consisting of high density polyethylene, linear low density polyethylene, very low density polyethylene, and ultra low density polyethylene.

2. The process according to claim 1, wherein the compound (3) is selected among compounds belonging to one of the following classes:
  (a) polyalcohols containing chains having from 4 to 8 carbon atoms;
  (b) hydroxyesters, having at least two free hydroxyl groups, obtained from carboxylic acids having from 8 to 22 carbon atoms and from polyalcohols;
  (c) N-alkyl-diethaaolamines of the formula $CH_3(CH_2)_nCH_2-N(CH_2CH_2OH)_2$, wherein n is greater than 2; and
  (d) polyepoxidate unsaturated oils.

3. The process according to claim 2, wherein the compound (3) is selected from the group consisting of 1,4-butanediol, sorbitol, glycerol-monostearate, sorbitan-monooleate, epoxidate linseed oil, epoxidate soya oil, and N-alkyl-diethanolamines of the formula $CH_3(CH)_3CH_2-N(CH_2CH_2OH)_2$, where n is comprised between 6 and 20.

4. The process according to claim 1, wherein the compound (3) is fed in an amount comprised between 100 and 2,000 ppm by weight with respect to the final polymer, the molar ratio of the compound (3) to the alkyl aluminum compound being comprised between 0.05 and 0.8.

5. The process according to claim 1, characterized in that an alkane having from 3 to 5 carbon atoms is present in the gas phase in a molar concentration of from 20 to 90% with respect to the total gas.

6. The process according to claim 5, wherein the alkane is propane.

7. The process according to claim 1, wherein the titanium compound comprises at least one halide-Ti bond.

8. The process according to claim 1, wherein the solid component comprises the inside electron donor.

9. The process according to claim 1, wherein the solid component (1) has a spherical shape.

* * * * *

UNITED STATES PATENT AND TRADEMARK OFFICE
CERTIFICATE OF CORRECTION

PATENT NO. : 5,410,002
DATED     : April 25, 1995
INVENTOR(S): Gabriele Govoni, et al.

It is certified that error appears in the above-identified patent and that said Letters Patent is hereby corrected as shown below:

| Column | Line | | |
|--------|------|---|---|
| 11 | 54 | | insert: --b.-- (before a polyfuncational) |

| Column | Line | | |
|--------|------|---|---|
| 12 | 39 | "diethaaolamines" | --diethanolamines-- |
| 12 | 48 | "$CH_3(CH)_3CH_2-N(CH_2CH_2OH)_2$" | --$CH_3(CH_2)_nCH_2-N(CH_2CH_2OH)_2$-- |

Signed and Sealed this

Fourth Day of July, 1995

Attest:

BRUCE LEHMAN

*Attesting Officer*     *Commissioner of Patents and Trademarks*